(12) United States Patent
Lin et al.

(10) Patent No.: US 12,184,000 B2
(45) Date of Patent: Dec. 31, 2024

(54) BIASING COVERS WITH CLIPS

(71) Applicant: Hewlett-Packard Development Company, L.P., Spring, TX (US)

(72) Inventors: Hsin-Tso Lin, Taipei (TW); Hung-Sung Pan, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 369 days.

(21) Appl. No.: 17/877,383

(22) Filed: Jul. 29, 2022

(65) Prior Publication Data

US 2024/0039191 A1 Feb. 1, 2024

(51) Int. Cl.
*H01R 12/70* (2011.01)
*H01R 12/71* (2011.01)
*H01R 13/627* (2006.01)
*H01R 13/635* (2006.01)

(52) U.S. Cl.
CPC ....... *H01R 12/7023* (2013.01); *H01R 12/716* (2013.01); *H01R 13/6273* (2013.01); *H01R 13/635* (2013.01)

(58) Field of Classification Search
CPC .............. H01R 12/7023; H01R 12/716; H01R 13/6273; H01R 13/635
See application file for complete search history.

(56) References Cited

U.S. PATENT DOCUMENTS

| | | | |
|---|---|---|---|
| 6,449,157 B1* | 9/2002 | Chu | H01L 23/4093 174/16.3 |
| 7,327,575 B2* | 2/2008 | Yu | H01L 23/4093 174/16.3 |
| 11,553,625 B2* | 1/2023 | Chang | G06F 1/182 |
| 2023/0273653 A1* | 8/2023 | Tsai | H01R 13/6582 439/62 |

* cited by examiner

*Primary Examiner* — Nathan Milakovich
(74) *Attorney, Agent, or Firm* — Quarles & Brady LLP

(57) ABSTRACT

In some examples, the disclosure describes a connector comprising a cover comprising a cover top, a first clip coupled to a first end of the cover, the first clip including a first lever and a first hook, a second clip coupled to a second end of the cover, the second clip including a second lever and a second hook, and a biasing member coupled to the cover top and disposed between the first clip and the second clip, the biasing member to apply pressure to the connector while the connector is disposed between the biasing member and the first hook and the second hook.

20 Claims, 5 Drawing Sheets

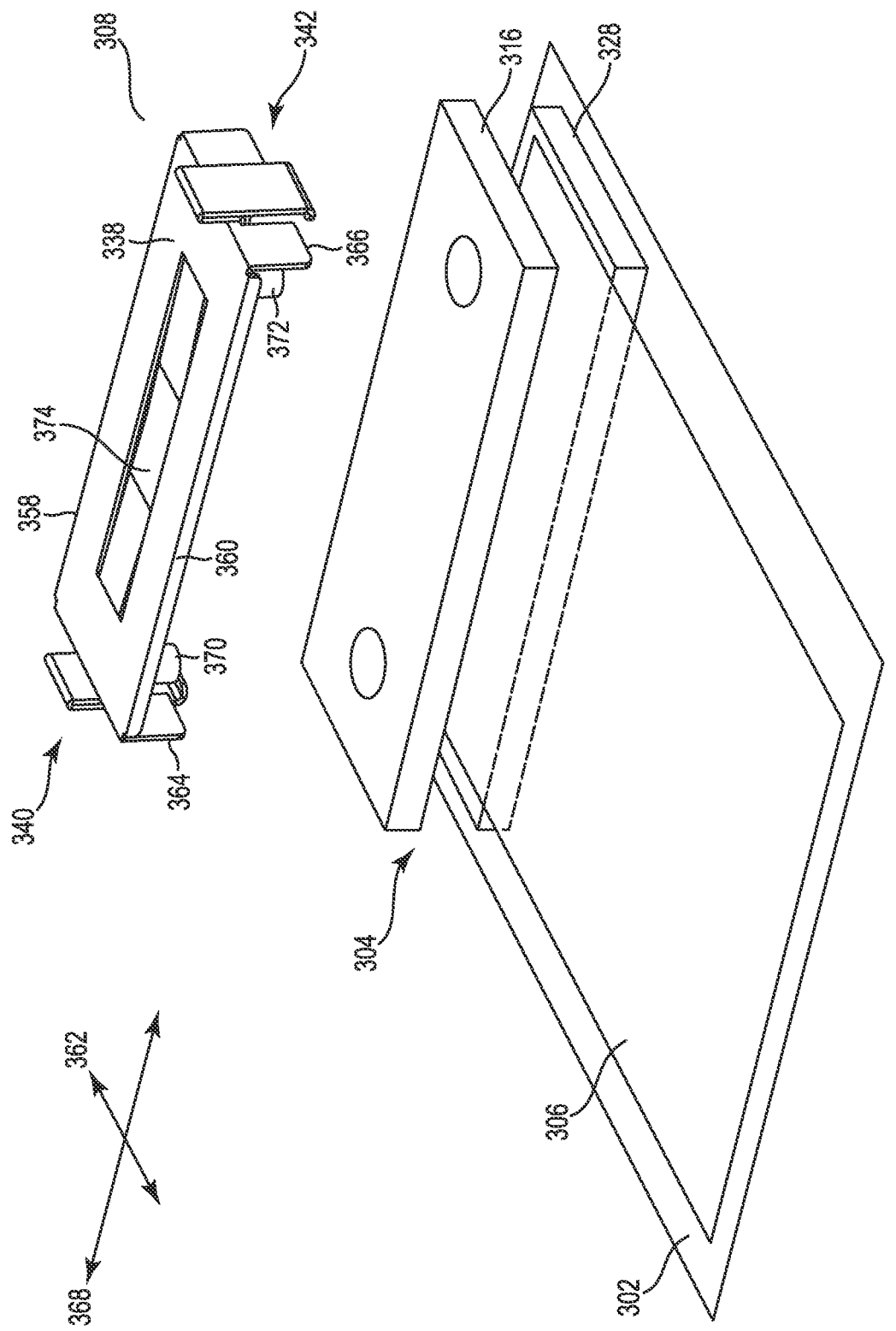

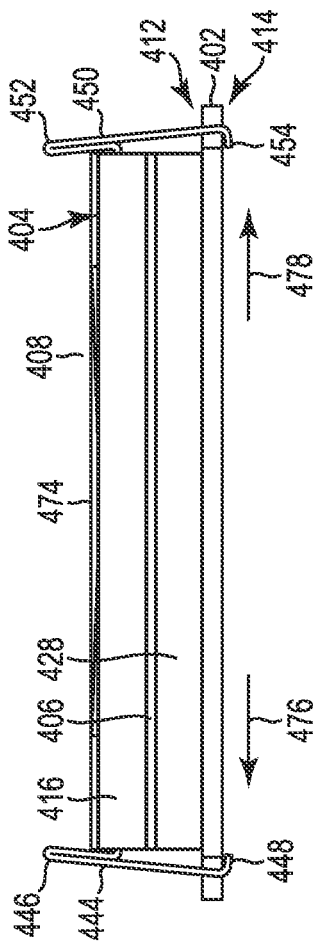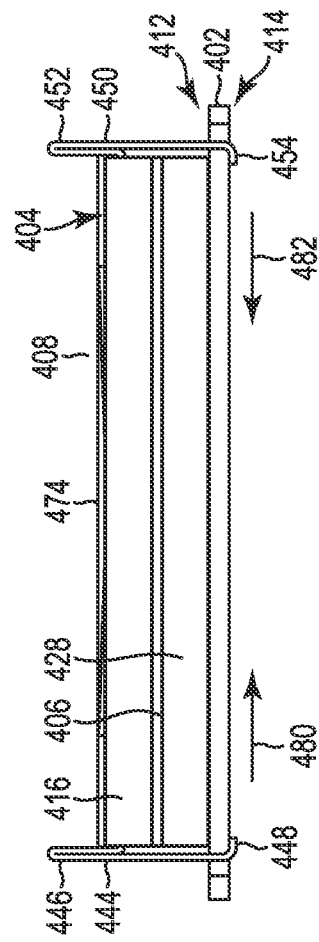

BIASING COVERS WITH CLIPS

BACKGROUND

Computing devices utilize multiple electronic components to operate various aspects of the computing device. In some examples, electronic components may be removed, replaced, or added to the computing device in order to replace failing components or enhance and/or upgrade the computing device. In some examples, hardware is utilized to physically and/or electrically couple the electronic components to the computing device.

BRIEF DESCRIPTION OF THE DRAWINGS

FIG. 3 illustrates an exploded perspective view of an example of a circuit board physically and electrically coupled with a connector utilizing a cover with alignment guides.

FIG. 4A illustrates an example of disengaging a cover with clips from a circuit board physically and electrically coupled to a connector utilizing the cover with clips.

FIG. 4B illustrates an example of engaging a circuit board physically and electrically to a connector utilizing a cover with clips.

DETAILED DESCRIPTION

Figures 1A, 1B:
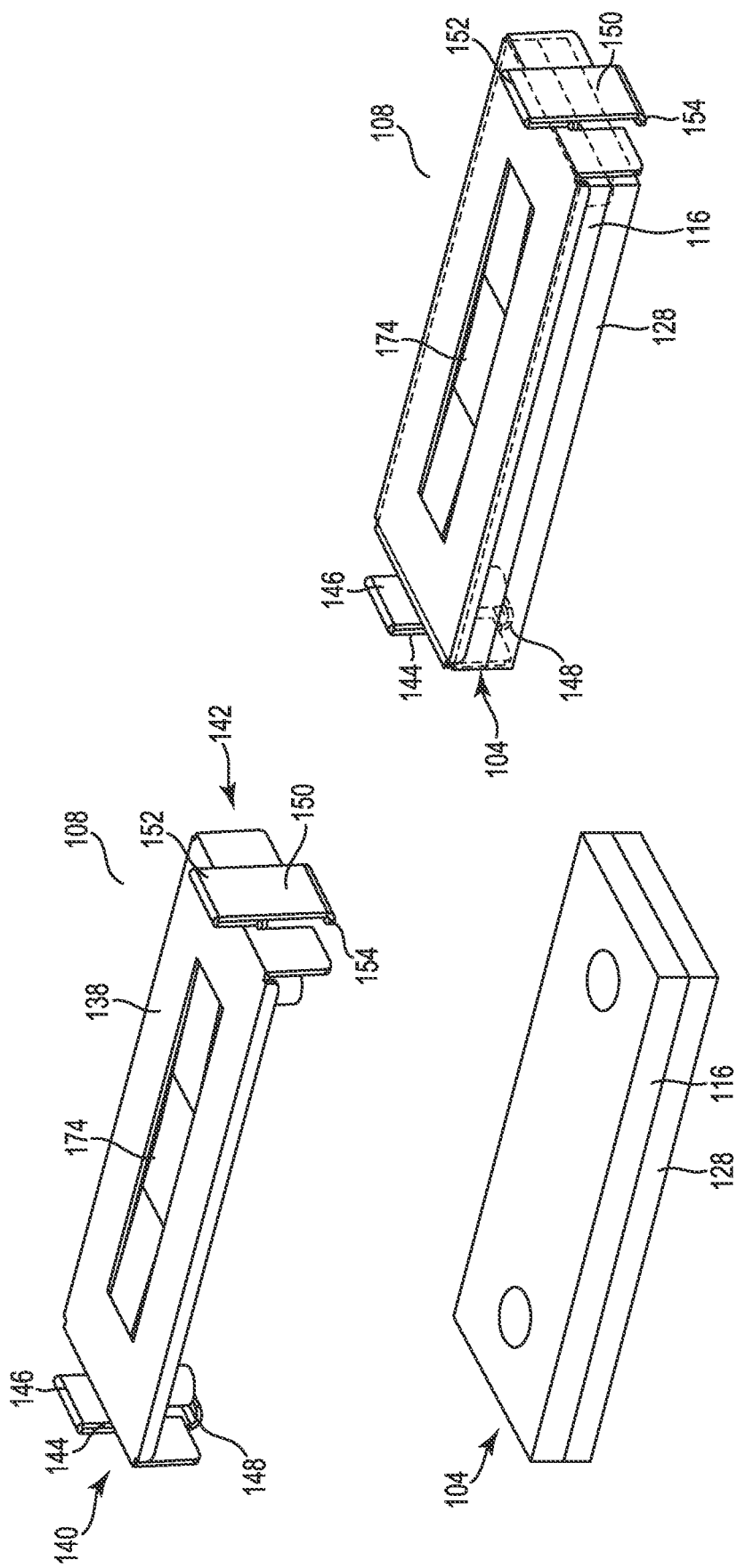
FIG. 1A illustrates an exploded perspective view of an example of a connector physically and electrically coupled utilizing a cover with clips.
FIG. 1B illustrates an example of a connector physically and electrically coupled utilizing a cover with clips.

A user may utilize a computing device for various purposes, such as for business and/or recreational use. As used herein, the term computing device refers to an electronic device having a processor and a memory resource. Examples of computing devices include, for instance, a laptop computer, a notebook computer, a desktop computer, an all-in-one (AIO computer), and/or a mobile device (e.g., a smart phone, tablet, personal digital assistant, smart glasses, a wrist-worn device, etc.), among other types of computing devices.

Computing devices include a variety of electronic components utilized to operate various aspects of the computing device. In some examples, computing devices include a main operating circuit board electrically and physically connecting the variety of electronic components and enabling signals to be transmitted and received between the electronic components. Examples of electronic components may include a computing module. As used herein, the term "computing module" refers to an independent component used as part of a computing system. Examples of a computing module include, for instance, a memory module, a graphics card, a sound card, an interface card (e.g., a network interface card (NIC)), a tuner card, and/or a modem card, among other types of computing modules.

In some examples, computing modules may be installed (e.g., by the manufacturer, distributor, end user, etc.) in the computing device. These computing modules may be removable to allow for easy replacement of failed components and/or for flexibility for changes such as advancements and/or upgrades in computing device capabilities. These removable computing modules may utilize hardware to secure and connect the removable computing module to the main operating circuit board of the computing device. The hardware may utilize fasteners such as screws to secure the hardware and/or computing module to the main circuit board. Fasteners may utilize corresponding tooling such as a screwdriver, allen wrench, etc., to attach and remove the hardware. Varying portions of the removable computing module or varying removable computing modules may utilize different sizes or types of fasteners and therefore different corresponding tooling.

In these examples, fasteners and/or tooling may be lost during shipping, installation, removal, etc., or may not be provided and may not easily be replaced. Additionally, fasteners and/or tooling may be inadvertently interchanged during shipping, installation, removal, etc. As such, utilizing the incorrect hardware or tooling may cause damage and/or failure to the hardware, the computing module, and/or the operating circuit board of the computing device.

Additionally, in some examples, varying torque values may be utilized dependent upon the fastener or computing module type. Adjusting the torque value of a tool may include additional equipment and knowledge of calibration techniques. The correct tool or the correct torque value calibrated tool may not be readily available for installation or removal of the fastener and the hardware. In some examples, the correct torque value for the fastener and/or computing module may not be known, causing the incorrect tooling to be utilized for installation or removal of the fastener and hardware. Over torquing a fastener may result in damage to the hardware, computing module, and/or the operating circuit board. Insufficient torque may result in loose hardware and/or intermittent connections causing intermittent or latent fails.

The present disclosure relates to a toolless, removable hardware utilized to secure a computing module to a computing device and to create an electrical and physical connection to the computing device. The hardware may include a cover utilizing a clip for installation and removal and a biasing member to secure the computing module physically and electrically to a main operating circuit board of the computing device.

FIG. 1A illustrates an exploded perspective view of an example of a connector 104 physically and electrically coupled utilizing a cover 108 with clips 144 and 150. As illustrated in FIG. 1A the connector 104 may include the cover 108. The cover 108 may be removable. The connector 104 may include a first segment 116 and a second segment 128. The first segment 116 and the second segment 128 may include corresponding physical characteristics (e.g., corresponding profiles, alignment ingresses and egresses, etc.) and the first segment 116, the second segment 128, or a combination hereof, may include electrical connections (e.g., terminals, traces, etc.). As described herein, while the cover 108 is disposed on the connector 104 (e.g., as shown in FIG. 1B), the cover 108 may physically and electrically couple the first segment 116 and the second segment 128 of the connector 104 together. Specifically, the cover 108 may physically and electrically couple the corresponding physical characteristics and electrical connections of the first segment 116 to the second segment 128.

In some examples, the cover 108 may include a cover top 138, a first end of the cover 140, and a second end of the cover 142. The cover top 138 may span the distance between the first end of the cover 140 and the second end of the cover 142.

The cover 108 may further include a first clip 144 and a second clip 150. The first clip 144 may be coupled to the first end of the cover 140, the first clip 144 including a first lever 146 and a first hook 148. The first lever 146 may move the first hook 148 in response to the first lever 146 being actuated (e.g., as further illustrated in FIG. 4A and FIG. 4B). The second clip 150 may be coupled to the second end of the cover 142, the second clip 150 including a second lever 152 and a second hook 154. The second lever 152 may move the second hook 154 in response to the second lever 152 being actuated (e.g., as further illustrated in FIG. 4A and FIG. 4B). Actuating the first lever 146 and the second lever 152 may allow for the first hook 148 and the second hook 154 to move to allow for the cover 108 to be installed onto the connector 104.

In some examples, the second segment 128 of the connector 104 may be coupled to a circuit board at a first side of the circuit board (e.g., as further described in connection with FIG. 4A, FIG. 4B, and FIG. 5). In some examples, while the cover 108 is disposed on the connector 104 the cover top 138 may engage with the first segment 116 at a first side of the connector 104 and while the first lever 146 and the second lever 152 are not actuated or in a not actuated position, the first hook 148 and the second hook 154 may be engaged with the circuit board at a second side of the circuit board (e.g., e.g., as further described in connection with FIG. 4A, FIG. 4B, and FIG. 5) opposite the first side of the circuit board.

As illustrated in FIG. 1A, the cover 108 may include a biasing member 174. As used herein, the term "biasing member" refers to an elastic device that stores mechanical energy. The biasing member 174 may be a compression spring, a torsion spring, a pogo pin, or a leaf spring, though examples of the disclosure are not so limiting. The biasing member 174 may be coupled to the cover top 138 and disposed between the first clip 144 and the second clip 150 of the cover 108. The biasing member 174 may apply pressure to the connector 104 while the connector 104 is disposed between the biasing member 174 and the first hook 148 and the second hook 154 of the cover 108.

As described above, while the cover 108 is disposed on the connector 104 the cover 108 may bias the connector 104 between the biasing member 174 and the first hook 148 of the first clip 144 and second hook 154 of the second clip 150 to physically and electrically couple the first segment 116 and the second segment 128 of the connector 104 together. Put another way, the biasing member 174 of the cover 108 may apply pressure to the connector 104 disposed between the biasing member 174 and the first hook 148 and the second hook 154 while the first hook 148 and the second hook 154 are engaged with the second side of the circuit board (e.g., e.g., as further described in connection with FIG. 4A, FIG. 4B, and FIG. 5) causing a physical and electrical connection between the first segment 116 and the second segment 128 of the connector 104.

FIG. 1B illustrates an example of a connector 104 physically and electrically coupled utilizing a cover 108 with clips 144 and 150. As illustrated in FIG. 1B, the cover 108 may be disposed on the connector 104. The cover 108 may include a biasing member 174, such as a leaf spring, though examples of the disclosure are not so limiting. The cover 108 may further include a first clip 144 including a first lever 146 and a first hook 148 and a second clip 150 including a second lever 152 and a second hook 154. In some examples, the first hook 148 is moved by actuating the first lever 146 and the second hook 154 is moved by actuating the second lever 152.

In some examples, actuating the first lever 146 may disengage the first hook 148 from the connector 104 disposed between the biasing member 174 and the first hook 148 and actuating the second lever 152 may disengage the second hook 154 from the connector 104 disposed between the biasing member 174 and the second hook 154. In this example, simultaneously actuating the first lever 146 and the second lever 152 may disengage the cover 108 from the connector 104. As such, simultaneously actuating the first lever 146 and the second lever 152 may disengage the cover 108 from the connector 104 and the circuit board (as further illustrated in FIG. 4A, FIG. 4B, and FIG. 5).

In some examples, the connector 104 comprises a first segment 116 and a second segment 128. The second segment 128 may be coupled to the circuit board at a first side of the circuit board. While the cover 108 is disposed on the connector 104 the first hook 148 and the second hook 154 may be engaged with a second side of the circuit board (e.g., e.g., as further described in connection with FIG. 4A, FIG. 4B, and FIG. 5). In this way, while the first hook 148 and the second hook 154 are engaged with the second side of the circuit board, the cover 108 couples and secures the first segment 116 to the second segment 128.

As described above, the biasing member 174 of the cover 108 contacts and applies pressure to the connector 104 at the first segment 116 of the connector 104 while the first hook 148 and the second hook 154 of the cover 108 are engaged with the second side of the circuit board to cause a physical and electrical connection between the first segment 116 and the second segment 128.

Figure 2:
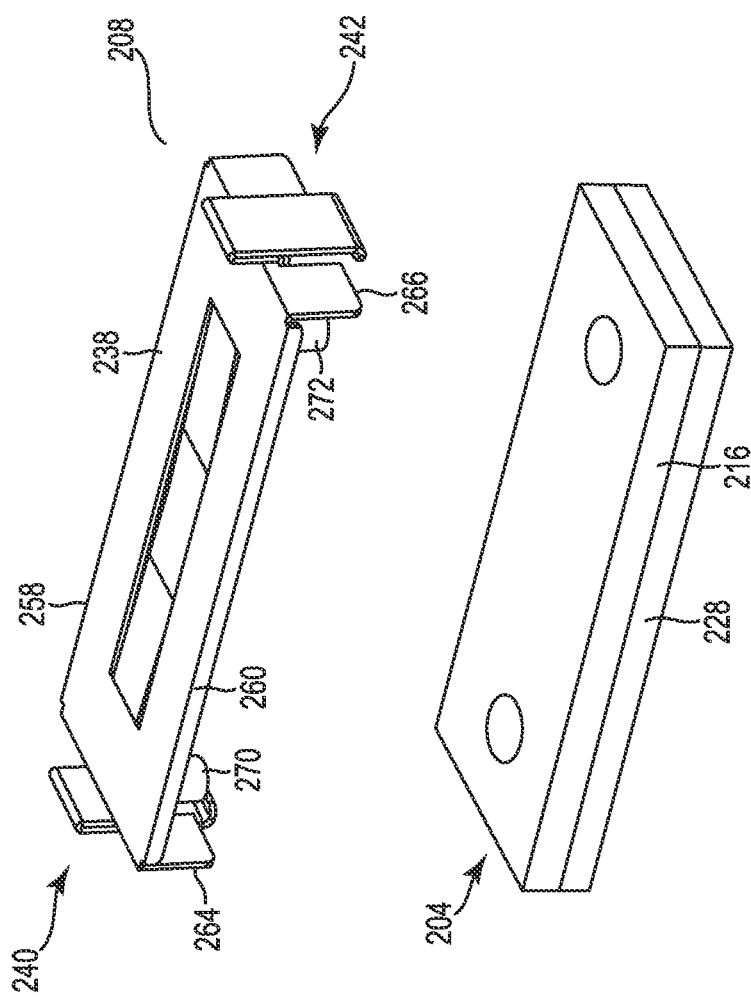
FIG. 2 illustrates an exploded perspective view of an example of a connector physically and electrically coupled utilizing a cover with alignment guides.

FIG. 2 illustrates an exploded perspective view of an example of a connector 204 physically and electrically coupled utilizing a cover 208 with alignment guides. In some examples, the connector 204 includes the same or similar elements as the connector 104 as referenced in FIG. 1A and FIG. 1B. For example, the connector 204 may include a first segment 216, a second segment 228, and the cover 208 including the same or similar elements as the cover 108 as reference in FIG. 1A and FIG. 1B.

The cover 208 may include a cover top 238, a first end of the cover 240, and a second end of the cover 242. In some examples, the cover 208 may include a first edge guide 258 and a second edge guide 260. The first edge guide 258 may be coupled to the cover top 238 and disposed between the first end of the cover 240 and the second end of the cover 242. The second edge guide 260 may be coupled opposite the first edge guide 258 to the cover top 238 and disposed between the first end of the cover 240 and the second end of the cover 242. The second edge guide 260 may be substantially parallel to the first edge guide 258. As used herein, the term "substantially" intends that the characteristic does not have to be absolute but is close enough so as to achieve the characteristic. For example, "substantially parallel" is not limited to absolute parallel. For instance, the second edge guide 260 can be within 0.5°, 1°, 2°, 5°, etc. of absolutely parallel to the first edge guide 258.

In some examples, the first edge guide 258 and the second edge guide 260 may span the distance between the first end of the cover 240 and the second end of the cover 242 (as shown in FIG. 2), may span less than the full distance between the first end of the cover 240 and the second end of the cover 242, and/or may comprise multiple segments. The first edge guide 258 and the second edge guide 260 may extend in a direction approximately perpendicular to the cover top 238, though examples of the disclosure are not so limiting. As used herein, the term "approximately" intends that the characteristic does not have to be absolute but is close enough so as to achieve the characteristic. For example, "approximately perpendicular" is not limited to absolute perpendicular. For instance, the first edge guide 258 and the second edge guide 260 can be within 0.5°, 1°, 2°, 5°, etc. of absolutely perpendicular to the cover top 238.

The cover 208 may include a first end guide 264 and a second end guide 266. The first end guide 264 may be disposed at the first end of the cover 240. The second end guide 266 may be opposite the first end guide 264 and disposed at the second end of the cover 242. The second end guide 266 may be substantially parallel to the first end guide 264.

In some examples, the first end guide 264 and the second end guide 266 may span the distance of the first end of the cover 240 and the second end of the cover 242 respectively, may span less than the full distance (as shown in FIG. 2), and/or may comprise multiple segments (as shown in FIG. 2). The first end guide 264 and the second end guide 266 may extend in a direction approximately perpendicular to the cover top 238, though examples of the disclosure are not so limiting. In some examples, the first end guide 264 and the second end guide 266 may be arranged at an angle approximately perpendicular to the first edge guide 258 and the second edge guide 260.

In these examples, the first edge guide 258, the second edge guide 260, the first end guide 264, and the second end guide 266 may align the cover 208 to the connector 204. For example, the first edge guide 258, the second edge guide 260, the first end guide 264, and the second end guide 266 may extend beyond the cover top 238. The first edge guide 258, the second edge guide 260, the first end guide 264, and the second end guide 266 may extend from the cover top 238 at an angle corresponding to a profile of the connector 204 (e.g., perpendicular, though examples are not so limiting). As such, while the cover 208 is disposed on the connector 204, the first edge guide 258, the second edge guide 260, the first end guide 264, and the second end guide 266 may extend past a surface of the first segment 216 of the connector 204 contacting the cover top 238 to align the cover 208 to the connector 204.

The cover 208 may further include a first guidepost 270 and a second guidepost 272 coupled to the cover top 238. In some examples, the first guidepost 270 and the second guidepost 272 may extend into and align the first segment 216 of the connector 204 with the second segment 228 of the connector 204. The first guidepost 270 and the second guidepost 272 may align physical and electrical connections of the first segment 216 and the second segment 228 of the connector 204.

As described above, the cover 208 may be aligned to the first segment 216 of the connector 204 utilizing the first edge guide 258, the second edge guide 260, the first end guide 264, and the second end guide 266. Further, the first guidepost 270 and the second guidepost 272 may be utilized to align physical and electrical connections of the first segment 216 of the connector 204 to corresponding physical and electrical connections of the second segment 228 of the connector 204. Additionally, in some examples, the first edge guide 258, the second edge guide 260, the first end guide 264, and/or the second end guide 266 may extend from the cover top 238 past the first segment 216 of the connector 204 and may align physical and electrical connections of the first segment 216 of the connector 204 to corresponding physical and electrical connections of the second segment 228 of the connector 204.

FIG. 3 illustrates an exploded perspective view of an example of a circuit board 302 physically and electrically coupled with a connector 304 utilizing a cover 308 with alignment guides. As illustrated in FIG. 3, the circuit board 302 may include the connector 304 coupled to the circuit board 302, a computing module 306 connected to the connector 304, and the cover 308 coupled to the connector 304. In some examples, the connector 304 and the cover 308 include the same or similar elements as the connector 104 and the cover 108 as referenced in FIG. 1A and FIG. 1B and the connector 204 and the cover 208 as referenced in FIG. 2.

In some examples, the connector 304 may include a first segment 316 and a second segment 328 and the computing module 306 may be disposed between the first segment 316 and the second segment 328. The computing module 306 may include physical characteristics that align with a physical profile of the first segment 316 and the second segment 328. Further, the computing module 306 may include electrical connections (e.g., terminals, traces, etc.) that align with electrical connections of the first segment 316, the second segment 328, or a combination thereof.

In some examples, the cover 308 may include a cover top 338, a first guidepost 370 and a second guidepost 372. The first guidepost 370 and the second guidepost 372 may be coupled to the cover top 338. In these examples, the first guidepost 370 and the second guidepost 372 may extend into the first segment 316, the computing module 306, and the second segment 328 to align physical and electrical connections of the connector 304 and the computing module 306 (e.g., as further described in connection with FIG. 5).

The cover 308 may further include a first edge guide 358 and a second edge guide 360 disposed between a first end of the cover 340 and a second end of the cover 342. The second edge guide 360 may be substantially parallel to the first edge guide 358. As described above, the first edge guide 358 and the second edge guide 360 may align the cover 308 to the connector 304. The first edge guide 358 and the second edge guide 360 may align the cover 308 to the connector 304 in a first direction 362.

The cover 308 may further include a first end guide 364 coupled to the first end of the cover 340 and a second end guide 366 coupled to the second end of the cover 342. The second end guide 366 may be substantially parallel to the first end guide 364. As described above, the first end guide 364 and the second end guide 366 may align the cover 308 to the connector 304. The first end guide 364 and the second end guide 366 may align the cover 308 to the connector 304 in a second direction 368.

As illustrated in FIG. 3, the cover 308 may include a biasing member 374 (e.g., a compression spring, a torsion spring, a pogo pin, a leaf spring, etc.). The biasing member 374 may be coupled to the cover top 338 and disposed between the first guidepost 370 and the second guidepost 372. The biasing member 374 may apply pressure to the first segment 316 of the connector 304 to couple the physical and electrical connections of the first segment 316, the computing module 306, and the second segment 328 together.

FIG. 4A illustrates an example of disengaging a cover 408 with clips 444 and 450 from a circuit board 402 physically and electrically coupled to a connector 404 utilizing the cover 408 with clips 444 and 450. The circuit board 402 may include the connector 404, a computing module 406, and the cover 408. In some examples, the connector 404 and the cover 408 include the same or similar elements as the connector 304 and the cover 308 as referenced in FIG. 3, the connector 204 and the cover 208 as referenced in FIG. 2, and the connector 104 and the cover 108 as referenced in FIG. 1A and FIG. 1B. For example, the connector 404 may include a first segment 416 and a second segment 428 and the cover 408 may include a biasing member 474.

As illustrated in FIG. 4A, the circuit board 402 may have a first side of the circuit board 412 and a second side of the circuit board 414. The connector 404 and the computing module 406 may be disposed on the first side of the circuit board 412. The connector 404 may physically and electrically couple to the circuit board 402 at the second segment 428 of the connector 404.

In some examples, the cover 408 may include a first clip 444 and a second clip 450 coupled to the cover 408, the first clip 444 including a first lever 446 and a first hook 448 and the second clip 450 including a second lever 452 and a second hook 454. The first clip 444 and the second clip 450 may engage with the circuit board 402 at the second side of the circuit board 414. Specifically, the first hook 448 of the first clip 444 may be engaged with the circuit board 402 at the second side of the circuit board 414 and the second hook 454 of the second clip 450 may be engaged with the circuit board 402 at the second side of the circuit board 414.

In some examples, while the first lever 446 is actuated the first lever 446 may cause the first hook 448 to move in a first direction 476 and while the second lever 452 is actuated the second lever 452 may cause the second hook 454 to move in a second direction 478. In this way, in response to the first clip 444 being moved in the first direction 476 the first clip 444 may disengage from the second side of the circuit board 414. Specifically, in response to actuating the first lever 446, the first lever 446 may disengage the first hook 448 from the second side of the circuit board 414. Further, in response to the second clip 450 being moved in the second direction 478 the second clip 450 may disengage from the second side of the circuit board 414. Specifically, in response to actuating the second lever 452, the second lever 452 may disengage the second hook 454 from the second side of the circuit board 414.

As such, in response to the first clip 444 being moved in the first direction 476 and the second clip 450 being moved in the second direction 478 the biasing member 474 applying pressure to the first segment 416 of the connector 404 may exert a force that causes the cover 408 to disengage from the circuit board 402. Put another way, in response to simultaneously disengaging the first hook 448 and the second hook 454 from the second side of the circuit board 414, in combination with the force exerted by the biasing member 474 on the first segment 416 of the connector 404, the cover top may push away from the first segment 416 of the connector 404 for removal of the cover 408 from the circuit board 402.

FIG. 4B illustrates an example of engaging a circuit board 402 physically and electrically to a connector 404 utilizing a cover 408 with clips 444 and 450. In some examples, the circuit board 402 includes the same or similar elements as the circuit board 402 as reference in FIG. 4A. For example, the circuit board 402 may include the connector 404, a computing module 406, and the cover 408. The connector 404 may include a first segment 416 and a second segment 428 and the cover 408 may include a biasing member 474.

As illustrated in FIG. 4B and described above, the cover 408 may include a first clip 444 and a second clip 450, the first clip 444 including a first lever 446 and a first hook 448 and the second clip 450 including a second lever 452 and a second hook 454. The circuit board 402 may have a first side of the circuit board 412 and a second side of the circuit board 414. The connector 404 and the computing module 406 may be disposed on the first side of the circuit board 412. The connector 404 may physically and electrically couple to the circuit board 412 at the second segment 428 of the connector 404. For example, physical characteristics of the second segment 428 may align with corresponding physical characteristics of the circuit board 412 and electrical traces, leads, terminals, etc. of the second segment 428 of the connector 404 may be aligned to and couple with electrical traces, pads, terminals, etc. of the circuit board 412.

As described above in reference to FIG. 4A, the cover 408 may be disengaged from the circuit board 402. While the cover 408 is disengaged from the circuit board 402, the connector 404, the computing module 406 and the circuit board 402 may physically and electrically be disengaged. Engaging the cover 408 with the circuit board 402 (or re-engaging the cover 408 with the circuit board 402) may cause the connector 404 to physically and electrically connect (or engage) with the computing module 406 and the circuit board 402.

To engage the cover 408 with the circuit board 402 the first lever 446 and the second lever 452 may be actuated causing the first hook 448 to be moved in a first direction (as depicted in FIG. 4A) and the second hook 454 to be moved in a second direction (as depicted in FIG. 4A). While the first lever 446 and the second lever 452 are actuated, the first hook 448 and the second hook 454 may extend in a direction away from the circuit board 402, enabling the first hook 448 and the second hook 454 of the cover 408 to traverse the thickness of the circuit board 402 from the first side of the circuit board 412 to the second side of the circuit board 414.

The cover 408 may be coupled to the circuit board 402 by releasing the first lever 446 and the second lever 452. As such, in response to releasing the first lever 446 the first hook 448 may move in a third direction 480, opposite a first direction depicted in FIG. 4A and described above, and may engage with the circuit board 402 at the second side of the circuit board 414. Additionally, in response to releasing the second lever 452 the second hook 454 may move in a fourth direction 482, opposite a second direction depicted in FIG. 4A and described above, and may engage with the circuit board 402 at the second side of the circuit board 414.

In this way, the first hook 448 of the first clip 444 may engage with the circuit board 402 at the second side of the circuit board 414 and the second hook 454 of the second clip 450 may engage with the circuit board 402 at the second side of the circuit board 414. As such, while the first hook 448 and the second hook 454 are engaged with the circuit board 402 at the second side of the circuit board 414 the biasing member 474 of the cover 408 may physically engage with the first side of the circuit board 412 at the first segment 416 of the connector 404, the first segment 416 of the connector 404 may physically and electrically engage with the computing module 406, the computing module 406 may physically and electrically engage with the second segment 428 of the connector 404, and the second segment 428 of the connector 404 may physically and electrically engage with the circuit board 402.

Figure 5:
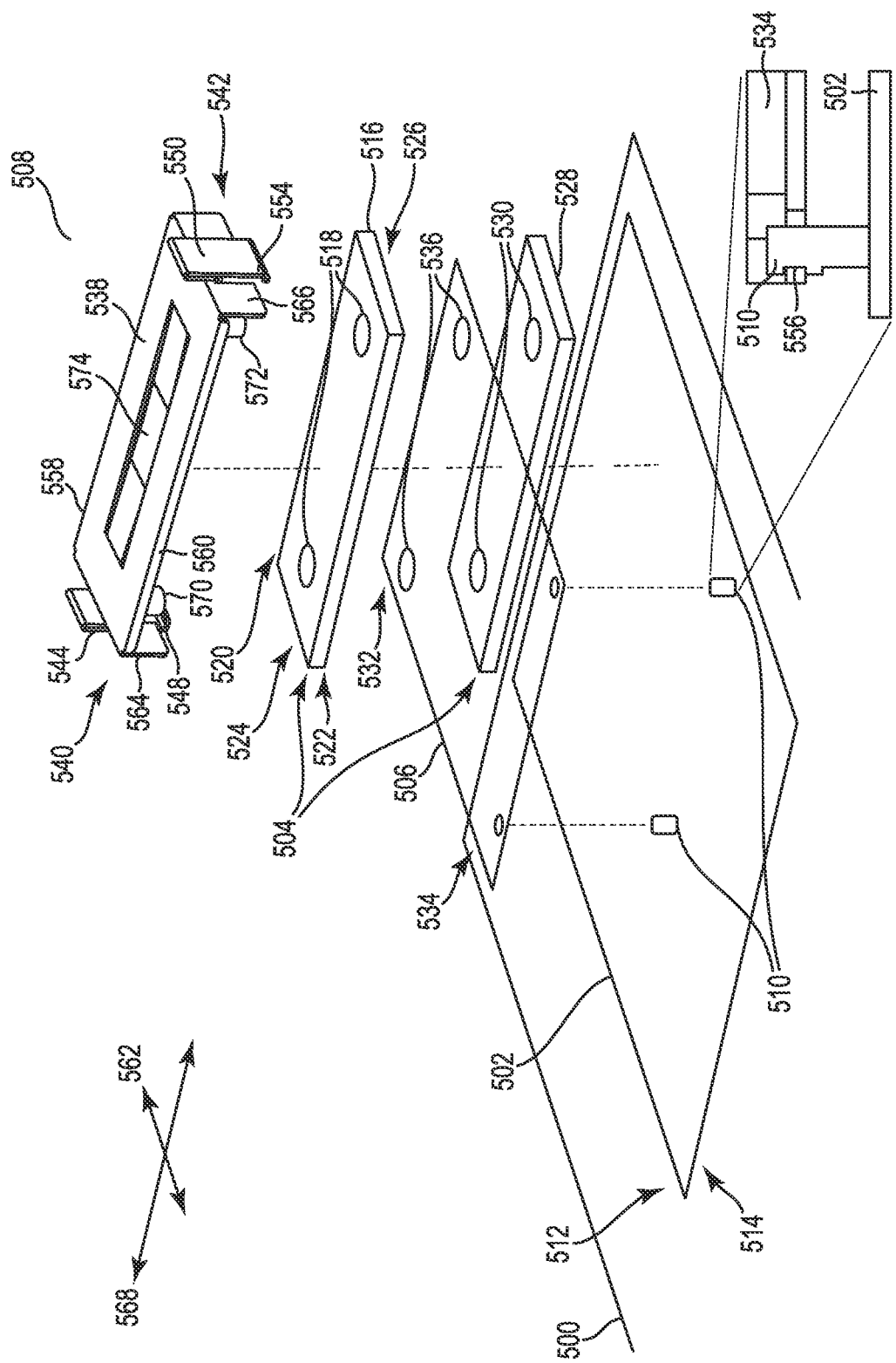
FIG. 5 illustrates an exploded perspective view of an example of a computing device including a circuit board physically and electrically coupled with a connector utilizing a cover with clips and alignment guides.

FIG. 5 illustrates an exploded perspective view of an example of a computing device 500 including a circuit board 502 physically and electrically coupled with a connector 504 utilizing a cover 508 with clips 544 and 550 and alignment guides 558, 560, 564, and 566. As illustrated in FIG. 5, the computing device 500 may include the circuit board 502, the connector 504, a computing module 506, and the cover 508. In some examples, the connector 504 and the cover 508 include the same or similar elements as the connector 404 and the cover 408 as referenced in FIG. 4A and FIG. 4B, the connector 304 and the cover 308 as referenced in FIG. 3, the connector 204 and the cover 208 as referenced in FIG. 2, and the connector 104 and the cover 108 as referenced in FIG. 1A and FIG. 1B and the circuit board 502 may include the same or similar elements as the circuit board 402 as referenced in FIG. 4A and FIG. 4B.

In some examples, the circuit board 502 may include a first side 512 of the circuit board 502 and a second side 514 of the circuit board 502. The connector 504 may be coupled to the first side 512 of the circuit board 502 and may include a first segment 516 and a second segment 528. The computing module 506 may be connected to the connector 504. In some examples, the computing module 506 may be disposed between and connected to the first segment 516 and the second segment 528 of the connector 504. In some examples, a first portion 532 of the computing module 506 may be disposed between the first segment 516 and the second segment 528 of the connector 504. The first portion 532 may include physical characteristics that align with a physical profile of the first segment 516 and the second segment 528. Further, the first portion 532 may include electrical connections (e.g., terminals, traces, etc.) that align with electrical connections of the first segment 516, the second segment 528, or a combination thereof. The cover 508 may couple to the connector 504 and the circuit board 502. As described in further detail below, the cover 508 may couple to and may support the first portion 532 of the computing module 532.

As described herein, the cover 508 may include a cover top 538, a first guidepost 570, and a second guidepost 572. The first guidepost 570 and the second guidepost 572 may be coupled to the cover top 538. In some examples, the first segment 516 of the connector 504 may include apertures 518, the computing module 506 may include apertures 536, and the second segment 528 of the connector 504 may include apertures 530. The first guidepost 570 and the second guidepost 572 may slide into corresponding apertures 518 of the first segment 516 of the connector 504, corresponding apertures 536 of the computing module 506, and corresponding apertures 530 of the second segment 528 of the connector 504 to align the computing module 506 with the connector 504.

A set of two guideposts and a set of two apertures are depicted for the cover 508 and the first segment 516, the computing module 506, and the second segment 528 respectively, though examples of this disclosure are not so limiting. Fewer or more than two guideposts and apertures may be used. Additionally, the circuit board 502 may include apertures (not depicted) and the guideposts may extend into the apertures of the circuit board 502 to align the connector 504 with the circuit board 502. In the same way, the computing device 500 may include apertures (not depicted) and the guideposts may extend into the apertures of the computing device 500 to align the circuit board 502 with the computing device 500.

As described herein, the cover 508 may include a first edge guide 558 coupled to a first edge 520 of the first segment 516 of the connector 504 and a second edge guide 560 coupled to a second edge 522 of the first segment 516 of the connector 504 to align the cover 508 to the connector 504 in a first alignment direction 562. Further, the cover 508 may include a first end guide 564 coupled to a first end 524 of the first segment 516 of the connector 504 and a second end guide 566 coupled to a second end 526 of the first segment 516 of the connector 504 to align the cover 508 to the connector 504 in a second alignment direction 568.

As described above, the cover 508 may include a biasing member 574 coupled to the cover top 538. The cover 508 may further include a first clip 544 coupled to a first end of the cover 540 and a second clip 550 coupled to a second end of the cover 542. The first clip 544 may include a first hook 548 to engage with the circuit board 502 at the second side 514 of the circuit board 502 and the second clip 550 may include a second hook 554 to engage with the circuit board 502 at the second side 514 of the circuit board 502.

While the first hook 548 and the second hook 554 are engaged with the circuit board 502 at the second side 514 of the circuit board 502, the biasing member 574 may apply pressure to the first segment 516 of the connector 504. In this way, the biasing member 574 may cause the first segment 516 of the connector 504 to physically and electrically engage with the computing module 506, the computing module 506 to physically and electrically engage with the second segment 528 of the connector 504, and the second segment 528 of the connector 504 to physically and electrically engage with the circuit board 502. In this way, while the first clip 544 and the second clip 550 are engage, the biasing member 574 applies pressure to the first segment 516 of the connector 504 and the second segment 528 of the connector 504 supports the first portion 532 of the computing module 506 biased between the first segment 516 and the second segment 528 by the cover 508.

In some examples, the circuit board 502 may include a standoff 510 (two standoffs are illustrated in FIG. 5, though examples are not so limiting, and any number of standoffs may be utilized). The standoff 510 may couple to and support a second portion 534 of the computing module 506. In some examples, the standoff 510 may include a height corresponding to the height of the second segment 528 of the connector 504. In this way, the computing module 506 may be supported at the first portion 532 of the computing module 506 by the second segment 528 of the connector 504 and may be supported at the second portion 534 of the computing module 506 by the standoff 510. Thus, the computing module 506 may be supported in an orientation substantially parallel to the circuit board 502.

In some examples, the standoff 510 may include an aperture 556. The computing module 506 may couple to the standoff 510 at the aperture 556 of the standoff 510 to support the second portion 534 of the computing module 506. In this example, the distance between the aperture 556 of the standoff 510 and the circuit board 502 may correspond to the height of the second segment 528 of the connector 504. The overall height of the standoff 510 may extend past the computing module 506 and may be greater than the height of the second segment 528. In this way, the portion of the standoff 510 extending past the computing module 506 may limit the placement of the computing module 506, aligning the second portion 534 of the computing module 506 during engaging and disengaging of the clips 544 and 550. The standoff 510 may be located at an end of the computing module 506 and the end of the second portion 534 of the computing module 506 may physically couple to the standoff 510 at the aperture 556 of the standoff 510, thus further aligning the computing module 506 in the first alignment direction 562.

In some examples, the standoff 510 may extend into a through-hole location of the computing module 506 (as illustrated in FIG. 5). In this example, the computing module 506 may seat into the aperture 556 of the standoff 510 and the standoff 510 may further align the computing module 506 in the first alignment direction 562 and/or in the second alignment direction 568. In this example, the standoff 510 may additionally minimize skewing of the computing module 506 and enhance the physical and electrical alignment of the computing module 506 to the first segment 516 and the second segment 528 of the connector 504.

In this example, the computing module 506 may be supported in an orientation substantially parallel to the circuit board 502 by the second segment 528 of the connector 504 and by the standoff 510. Further, the computing module 506 may be physically and electrically aligned to the connector 504 utilizing the first guidepost 570, the second guidepost 572, the first edge guide 558, the second edge guide 560, the first end guide 564 and the second end guide 566 and the aperture 556 of the standoff 510. In this way, the cover 508 may bias the connector 504, computing module 506, and circuit board 502 together physically and electrically and may be installed and removed without utilizing additional fasteners or tooling.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" refers to one such thing or more than one such thing.

The figures herein follow a numbering convention in which the first digit corresponds to the drawing figure number and the remaining digits identify an element or component in the drawing. For example, reference numeral 104 may refer to element 104 in FIG. 1 and an analogous element may be identified by reference numeral 304 in FIG. 3. Elements shown in the various figures herein can be added, exchanged, and/or eliminated to provide additional examples of the disclosure. In addition, the proportion and the relative scale of the elements provided in the figures are intended to illustrate the examples of the disclosure and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples, and data provide a description of the system and methods of the disclosure. Since many examples can be made without departing from the spirit and scope of the system and method of the disclosure, this specification merely sets forth some of the many possible example configurations and implementations.

What is claimed is:

1. A connector comprising:
a cover comprising:
 a cover top;
 a first clip coupled to a first end of the cover, the first clip including a first lever and a first hook;
 a second clip coupled to a second end of the cover, the second clip including a second lever and a second hook; and
 a biasing member coupled to the cover top and disposed between the first clip and the second clip, the biasing member to apply pressure to the connector while the connector is disposed between the biasing member and the first hook and the second hook.

2. The connector of claim 1, wherein the first hook is moved by actuating the first lever and the second hook is moved by actuating the second lever.

3. The connector of claim 2, wherein:
actuating the first lever disengages the first hook from the connector disposed between the biasing member and the first hook and actuating the second lever disengages the second hook from the connector disposed between the biasing member and the second hook; and
simultaneously actuating the first lever and the second lever disengages the cover from the connector.

4. The connector of claim 1, wherein the cover further comprises:
a first edge guide disposed between the first end of the cover and the second end of the cover;
a second edge guide opposite the first edge guide and disposed between the first end of the cover and the second end of the cover, the second edge guide being substantially parallel to the first edge guide;
a first end guide disposed at the first end of the cover; and
a second end guide opposite the first end guide and disposed at the second end of the cover, the second end guide being substantially parallel to the first end guide;
wherein the first edge guide, the second edge guide, the first end guide, and the second end guide align the cover to the connector.

5. The connector of claim 1, wherein the connector comprises a first segment and a second segment and while the first hook and the second hook are engaged, the cover couples and secures the first segment to the second segment.

6. The connector of claim 5, wherein the second segment of the connector is coupled to a circuit board at a first side of the circuit board and the first hook and the second hook engage with the circuit board at a second side of the circuit board.

7. The connector of claim 6, wherein the biasing member of the cover contacts and applies pressure to the connector at the first segment while the first hook and the second hook are engaged with the second side of the circuit board, to cause a physical and electrical connection between the first segment and the second segment.

8. The connector of claim 5, further comprising a first guidepost and a second guidepost coupled to the cover top, wherein the first guidepost and the second guidepost extend into and align the first segment with the second segment.

9. The connector of claim 1, wherein the biasing member is a leaf spring.

10. A circuit board, comprising:
a connector coupled to the circuit board;
a computing module connected to the connector; and
a cover coupled to the connector, the cover comprising:
 a cover top;
 a first guidepost and a second guidepost coupled to the cover top;
 a first edge guide and a second edge guide disposed between a first end of the cover and a second end of the cover, the second edge guide being substantially parallel to the first edge guide;
 a first end guide coupled to the first end of the cover;
 a second end guide coupled to the second end of the cover, the second end guide being substantially parallel to the first end guide; and a biasing member coupled to the cover top and disposed between the first guidepost and the second guidepost.

11. The circuit board of claim 10, wherein:
the first edge guide and the second edge guide align the cover to the connector in a first alignment direction; and
the first end guide and the second end guide align the cover to the connector in a second alignment direction.

12. The circuit board of claim 10, further comprising a first clip and a second clip coupled to the cover, wherein the connector and a first portion of the computing module are disposed between the biasing member and the first clip and the second clip.

13. The circuit board of claim 12, wherein:
the connector comprises a first segment and a second segment and the computing module is disposed between the first segment and the second segment; and
the first guidepost and the second guidepost extend into the first segment, the computing module, and the second segment to align physical and electrical connections of the connector and the computing module.

14. The circuit board of claim 13, wherein:
the connector and the computing module are disposed on a first side of the circuit board;
the first clip and the second clip engage with the circuit board at a second side of the circuit board;
in response to the first clip being moved in a first direction the first clip is disengaged from the second side of the circuit board;
in response to the second clip being moved in a second direction the second clip is disengaged from the second side of the circuit board; and
in response to the first clip being moved in the first direction and the second clip being moved in the second direction the biasing member applying pressure to the first segment of the connector exerts a force that causes the cover to disengage from the circuit board.

15. The circuit board of claim 14 wherein, while the first clip and the second clip are engaged, the biasing member applies pressure to the first segment of the connector and the second segment of the connector supports the first portion of the computing module.

16. The circuit board of claim 10, further comprising a standoff including an aperture, the computing module coupled to the standoff at the aperture of the standoff to support a second portion of the computing module.

17. A computing device comprising:
a circuit board including a first side and a second side, the circuit board comprising:
a connector coupled to the first side of the circuit board, the connector including a first segment and a second segment;
a computing module connected to the connector;
a cover to couple to and support a first portion the computing module, the cover comprising:
a cover top;
a first guidepost and a second guidepost coupled to the cover top, wherein the first guidepost and the second guidepost slide into corresponding apertures of the first segment of the connector, the computing module, and the second segment of the connector to align the computing module with the connector;
a first edge guide coupled to a first edge of the first segment of the connector and a second edge guide coupled to a second edge of the first segment of the connector to align the cover to the connector in a first alignment direction;
a first end guide coupled to a first end of the first segment of the connector and a second end guide coupled to a second end of the first segment of the connector to align the cover to the connector in a second alignment direction:
a biasing member coupled to the cover top to apply pressure to the first segment of the connector;
a first clip coupled to a first end of the cover and including a first hook to engage with the circuit board at the second side of the circuit board; and
a second clip coupled to a second end of the cover and including a second hook to engage with the circuit board at the second side of the circuit board; and
a standoff to couple to and support a second portion of the computing module.

18. The computing device of claim 17, wherein:
the first clip includes a first lever, wherein while the first lever is actuated the first lever causes the first hook to move in a first direction; and
the second clip includes a second lever, wherein while the second lever is actuated the second lever causes the second hook to move in a second direction;
wherein:
in response to releasing the first lever the first hook moves in a third direction, opposite the first direction, and engages with the circuit board at the second side of the circuit board; and
in response to releasing the second lever the second hook moves in a fourth direction, opposite the second direction, and engages with the circuit board at the second side of the circuit board.

19. The computing device of claim 18, wherein while the first hook and the second hook are engaged with the circuit board at the second side of the circuit board the biasing member of the cover physically engages with the first side of the circuit board at the first segment of the connector, the first segment of the connector physically and electrically engages with the computing module, the computing module physically and electrically engages with the second segment of the connector, and the second segment of the connector physically and electrically engages with the circuit board.

20. The computing device of claim 18, wherein:
in response to actuating the first lever, the first lever disengages the first hook from the second side of the circuit board;
in response to actuating the second lever, the second lever disengages the second hook from the second side of the circuit board; and
in response to simultaneously disengaging the first hook and the second hook from the second side of the circuit board, in combination with the force exerted by the biasing member on the first segment of the connector, the cover top pushes away from the first segment of the connector for removal of the cover from the circuit board.

* * * * *